July 15, 1969 R. R. VAN DER VEEN 3,456,083

ARRANGEMENT FOR IDENTIFYING PUSHBUTTON SIGNALS

Filed Aug. 27, 1965

INVENTOR.
ROELOF R. VAN DER VEEN
BY
Frank R. Trifari
AGENT

United States Patent Office 3,456,083
Patented July 15, 1969

3,456,083
ARRANGEMENT FOR IDENTIFYING PUSH-BUTTON SIGNALS
Roelof Reinier van der Veen, Nilversum, Netherlands, assignor, by mesne assignments, to U.S. Philips Corporation, New York, N.Y., a corporation of Delaware
Filed Aug. 27, 1965, Ser. No. 483,214
Claims priority, application Netherlands, Sept. 15, 1964, 6410711
Int. Cl. H04m 3/02, 3/26, 1/24
U.S. Cl. 179—16 6 Claims

ABSTRACT OF THE DISCLOSURE

In order to compensate for length variations and the consequent resistance variations of the transmission lines of pushbutton signalling systems, the line is operated at test intervals at its maximum current value and threshold devices, responsive to current values corresponding to the different pushbutton signals, are automatically adjusted to operating values in consonance with the line resistance as determined by the current flow during the test period.

The invention relates to an arrangement for identifying pushbutton signals which originate from transmission lines having variable lengths and which have the form of direct currents of different levels which are produced in the transmission lines in that this line is closed on the transmitter side by resistors having pre-determined resistance values and in that this line is connected on the receiver side to a direct voltage source, comprising a plurality of threshold devices which each supply an output signal of the first kind if the received direct current is lower than a threshold level associated with the threshold device and which supply an output signal of the second kind if the received current is higher than this threshold level.

Such arrangements are used in automatic telephone systems. Efforts are made to enlarge the number of possible pushbutton signals.

The invention has for its object to provide an arrangement of the aforementioned kind with which in a reliable manner a great number of different pushbutton signals may be distinguished.

The arrangement in accordance with the invention is characterized in that means are provided with which the threshold levels of the threshold devices are automatically adjusted in accordance with the length of the transmission line in a manner such that the threshold levels constantly lie between the various possible levels of the received direct current independently of the length of the transmission line.

The invention will now be described more fully with reference to an embodiment shown in the accompanying drawing, in which.

Figure 2:
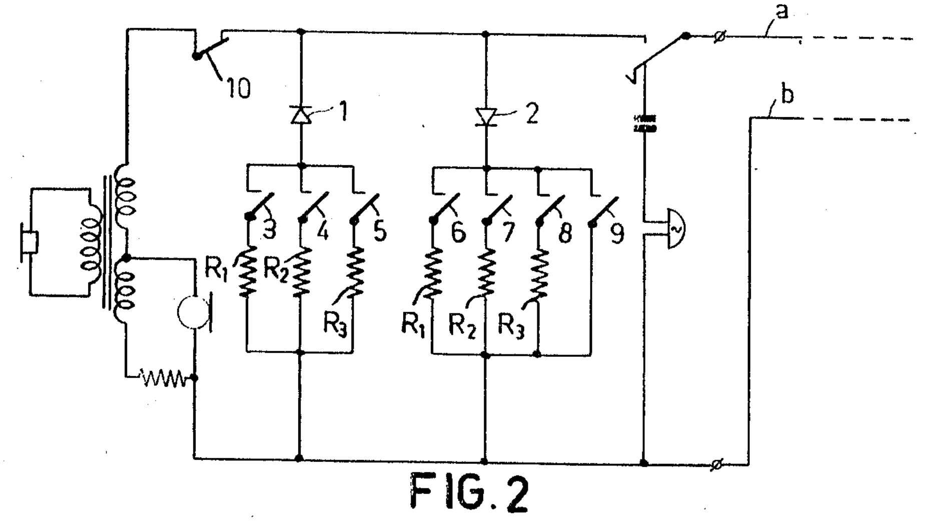
FIG. 2 shows a simplified circuit arrangement of a telephone set having pushbutton signalling.

In the present pushbutton signalling system, the normal impedance of the telephone set is replaced by another impedance when a key is depressed. This impedance is characteristic of the depressed key and the depressed key may be identified by measuring from the telephone exchange the included impedance. As shown in FIG. 2, the impedance is constituted by the parallel-combination of a first series-combination of a resistor and a diode 1 and of a second series-combination of a resistor and a diode 2. The diodes 1, 2 are polarized in opposite senses so that the diode 1 passes current in the normal direction of the line current while the diode 2 passes current in the reverse current direction. The resistor switched on for the normal current direction has the value $R_1$, $R_2$, $R_3$ or infinite while the resistor switched on for the other current direction has the value zero, $R_1$, $R_2$, $R_3$ or infinite. Consequently, 20 resistor combinations are possible of which the combination infinite-infinite is not used. The contacts 3 to 9 represent the key contacts and contact 10 is a general interruption contact which is opened when an arbitrary key is depressed and disconnects the speech circuit.

Figure 1:
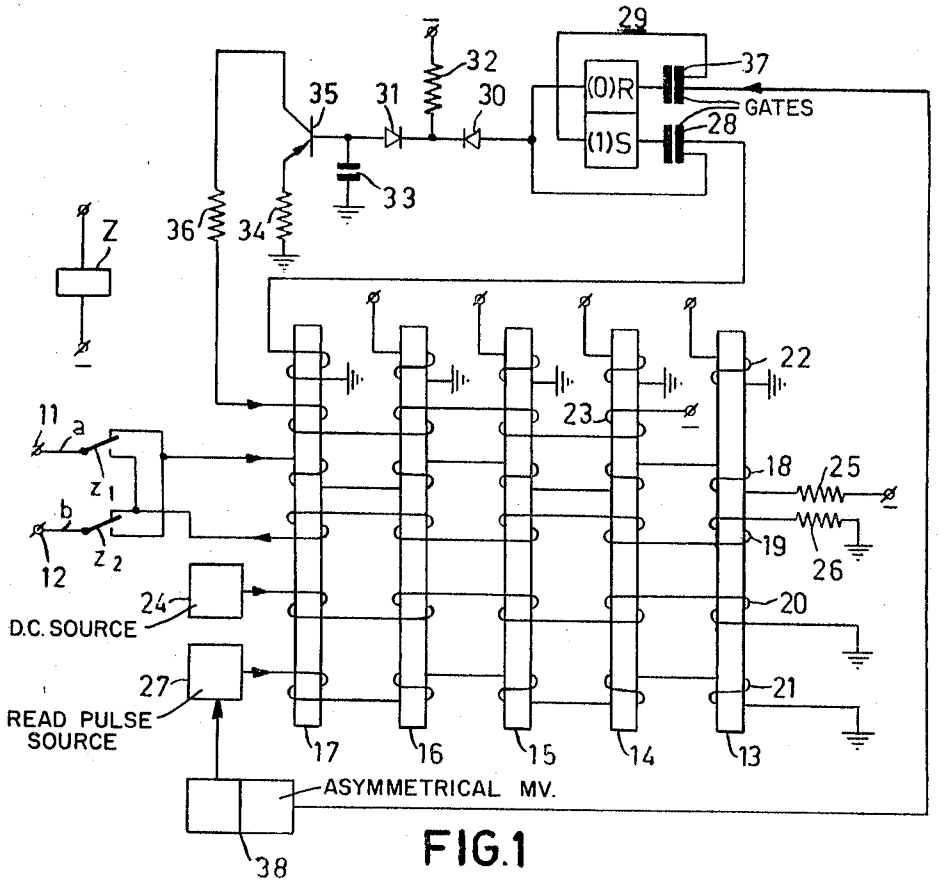
FIG. 1 shows an embodiment of a receiving device in accordance with the invention.

The telephone set is connected through the *a*- and *b*-lines of a subscriber line to a telephone exchange. This telephone exchange comprises receiving devices of the kind shown in FIG. 1 and connecting means for establishing galvanic connections between the subscriber lines and the receiving devices. With the aid of these connecting means the *a*-line is galvanically connected with an input terminal 11 while the *b*-line is galvanically connected with an input terminal 12.

The impedance included in the telephone set is measured by means of current measurements. First the current is measured in the normal current direction, subsequently the polarity of the voltage between the *a*-line and the *b*-line is reversed and the current is measured in the reverse current direction. The current is measured with the aid of the magnet cores 13 to 17 which in the ideal case exhibit a positive saturation inductance $+Bs$ if the total number of ampere turns is positive and which exhibit a negative saturation inductance $-Bs$ if the total number of ampere turns is negative. Each core has wound on it a pair of line windings 18 and 19, a polarization winding 20, a reading winding 21 and an output winding 22, as is indicated for core 13. Each core, except the core 13 has further wound on it an expansion winding 23, as is indicated for core 14.

A direct current polarization source 24 applies a direct polarization current to the series-connected polarization windings 20 of all the cores. The polarization current produces on each core the effect of a plurality of ampere turns. The sign of the polarization ampere turns is assumed to be positive for each core. The direction in which the polarization current passes through the polarization windings is indicated with an arrow so that a positive number of ampere turns for each core corresponds with a magnetization in upward direction. The input terminal 11 is connected through the series-combination of a break contact *z*1, the series-connected line windings 18 and a supply resistor 25 to the negative terminal of the central battery while the input terminal 12 is connected through a break contact *z*2, the series-connected line windings 19 and a supply resistor 26 to earth. With respect to the direction of the current flowing through the line windings 18 and 19, these windings are wound on the cores so that the ampere turns of these windings have a negative sign with respect to the polarization ampere turns. By a choice of the polarization current and the number of turns, the number of polarization ampere windings of each core is adjusted so that the total number of ampere windings is zero at a pre-determined value of the line current associated with the core. If the line current is higher than the pre-determined value, the total number of ampere turns is negative and the core has the negative saturation inductance $-Bs$ and if the line current is lower than the predetermined value, the total number of ampere turns is positive and the core has the positive saturation inductance $+Bs$. A reading pulse source 27 applies reading pulses to the series-connected reading windings 21, in which event the winding sense of the reading windings with respect to the direction of the reading current is chosen so that the total number of ampere turns in the cores 13 to 16 is reduced to a negative value while the total number of ampere turns in the core 17 is raised to a positive value. Consequently, the inductance in the cores 13, 14, 15, 16 is varied only when the original number of ampere turns of the concerned core is positive, that is to say when the line current is lower than the pre-determined value associated with the core. The inductance in the core 17 is varied only when the original number of ampere turns is negative, that is to say when the line current is higher than the pre-determined current value associated with the core 17.

The critical current values associated with the cores are all different from each other and increase in value from core 13 to core 17. As a result, the cores 13, 14, 15 and 16 induce a pulse in the output winding 22 during a reading current pulse if the value of the line current is lower than the critical current value of the core 13, the cores 14, 15 and 16 supply an output pulse if the value of the line current lies between the critical current values of the cores 13 and 14, the cores 15 and 16 supply an output pulse if the value of the line current lies between the critical current values 14 and 15, the core 16 supplies an output pulse if the value of the line current lies between the critical current values of the cores 15 and 16 and none of the cores 13 to 16 supplies an output pulse if the value of the line current is higher than the critical current value of the core 16. The core 17 supplies an output pulse for the values of the line current which are higher than the critical current value of this core.

By the use of the five resistance values 0, R1, R2, R3 and infinite, it must be possible to distinguish altogether five different line current values, referred to hereinafter as signal values, associated with these resistance values. The signal values are not constant but lie each within a given stray interval. The resistances R1, R2 and R3 are chosen so that the spacings between the various stray intervals are approximately equal to each other at a given indicated maximum loop resistance. The critical current values of the cores 13 to 16 are each adjusted to the centre between two successive stray intervals. The critical current value of the core 17 is adjusted to the nominal value of the line current in case of a closed loop. The resistance values R1, R2 and R3 may be, for example, 1000Ω, 2700Ω and 7500Ω. The nominal values of the line currents associated with these resistance values amount to 15.5 ma., 11 ma. and 6 ma. in case of a loop resistance of the subscriber line of 1500Ω, a central battery voltage of 48 v. and supply resistors (25, 26) of 400Ω. The maximum permissible leakage current in case of an open line loop or of a resistor adjusted to infinite value amounts to approximately 3 ma. and the nominal value of the line current in case of a closed line loop or of a switched-on speech circuit amounts to 20 ma. The critical current values associated with the cores 13 to 16 are adjusted to 4 ma., 8 ma., 14 ma. and 18 ma. The critical current value associated with the core 17 is adjusted to 20 ma. The spacing between the pre-adjusted critical current values and the adjacent stray intervals roughly amounts to 1 to 2 ma. and this spacing is required for guaranteeing a reliable operation of the receiving device. The said small spacing does not permit, however, of compensating for the stray due to different lengths of the subscriber line.

In order to render the receiving device described hereinbefore suitable for arbitrary subscriber lines having a loop resistance of from 0 to 1500Ω, the critical current values of the cores 14 to 16 are raised to higher current values in dependence upon the loop resistance of the subscriber line in a manner such that these values are adjusted approximately to the centre between the stray intervals of the likewise raised signal values. It has been found that such an increase of the critical current values may be realized in a simple manner by applying an additional polarization current to the series-connected expansion windings 23 the numbers of turns of which have a given ratio to each other.

The additional polarization current which likewise flows through a winding 23 of the core 17 promotes the effect of the polarization current flowing through the polarization windings 20 and is adjusted prior to the measurement proper of the signal values so that the core 17 no longer supplies any output pulses.

If in case of a switch-on speech circuit, consequently before a key is depressed, the line current is higher than 20 ma., the core 17 supplies an output pulse during a reading current pulse. This pulse is applied to the input of a setting gate 28. The output of gate 28 is applied to one input of bistable circuit 29. The control terminal of the setting gate 28 is connected to a first output terminal of the bistable circuit which is at ground potential in the position O of the bistable circuit. When the control terminal of the gate 28 is at ground potential, pulses applied to the input from the read winding of core 17 can pass through the gate. Under these conditions, the pulse gate passes a pulse to the setting input S of the bistable circuit which is consequently changed over to the position 1. In this position, the O-output is at a negative potential, as a result of which the diode 30 connected to this input is blocked and the gate 28 is blocked. Consequently, the junction of the diodes 30 and 31 which is connected through a resistor 32 to a negative point of supply may receive negative voltage. A capacitor 33 is charged negatively through the series-combination of the diode 31 and the resistor 32. The voltage across the capacitor is supplied in the form of a control voltage to the base electrode of a transistor 35 connected in common emitter arrangement by means of a resistor 34. The collector current supplied by the transistor as a result of the control voltage applied is supplied in the form of an additional polarization current through a resistor 36 to the series-connected expansion windings 23. The capacitor 33 is charged negatively as long as the bistable circuit 29 is in the position 1. In this position the second output terminal of the bistable circuit which is connected to the control terminal of a resetting gate 37, is at ground potential, as a result of which the re-setting gate is opened. The bistable circuit is reset to position 0 by a pulse applied to its input terminal from asymmetrical multivibrator 38. The multivibrator 38 triggers the reading pulse source 27 once every 5 milliseconds, whereupon source 27 supplies a reading current pulse. The multivibrator applies a resetting pulse to the re-setting gate 37 just before each starting instant of the pulse source 27. When this re-setting gate has been opened by the potential applied to its control terminal, it passes a pulse to the re-setting input R, as a result of which the bistable circuit is reset to the position 0. In this manner, the capacitor 33 is charged for approximately 5 milliseconds each time after the core 17 supplies an output pulse, which each time results in an increase of the collector current. The capacitor 33 has a high capacity and is discharged slowly so that the additional polarization current, after it has reached a final value, substantially retains this final value. The final value of the additional polarization current is automatically adjusted so that the core 17 no longer supplies an output pulse so that the critical current value of the core 17 is automatically adjusted to the line current flowing in case of a switch-on speech circuit.

The additional polarization current also increases the critical current values of the cores 14 to 16 and it has been found that the choice of a correct ratio between the numbers of turns of the expansion windings renders it possible to increase the critical current values so that they are again adjusted to the centre between stray intervals of the modified signal values. In the practical embodiment described above, a winding ratio of 16:4:2:1 between the expansion windings of the cores 17, 16, 15 and 14 has proved to be satisfactory. A correction of the critical current value of the core 13 yields only a slight improvement and such a correction has consequently been dispensed with in the receiving device shown in FIG. 1.

It should be noted that by the use of the aforementioned correction method the spacing between the stray intervals increases according as the loop resistance decreases. A favourable difference is thus obtained with respect to a method already suggested in which the loop resistance of all the subscriber lines is completed to a maximum loop resistance of 1500Ω.

After the receiving device has been matched to the loop resistance of the subscriber line, the subscriber may start dialling. In accordance therewith, dialling tone is transmitted to the subscriber as soon as the additional polarization current has attained a final value, which is characterized in that output pulses of core 17 fail to appear. After a key has been depressed, the signal value for the normal current direction appears in a pulse code at the output windings 22 of the cores 13 to 17. This coded signal value is transmitted to a register and is stored therein. Subsequently, the change-over relay Z is energized, the contacts Z1 and Z2 of which interchange the *a*-line and the *b*-line of the subscriber line. The signal value for the reverse current direction then appears at the output windings 22 of the cores 13 to 16. This coded signal value is likewise transmitted to the register and in the register the identity of the key of the telephone set which has been depressed is derived from the combination of the two signal values. Subsequently, the energization of the relay Z is interrupted, as a result of which the relay is de-energized and the voltage between the *a*-line and the *b*-line regains its normal polarity.

The value of the additional polarization current slightly decreases due to the discharge of capacitor 33. This current decrease is compensated for, however, in the interval between the release of a key and the depression of a subsequent key, in which interval the additional current may be adjusted, if required, again to the original and desired final value by means of one or more output pulses of the core 17.

What is claimed is:

1. An arrangement for identifying pushbutton signals which originate from transmission lines having variable lengths and which have the form of direct currents of different levels which are produced in a transmission line in that this line is closed on the transmitter side by resistors having predetermined resistance values and in that this line is connected on the receiver side to a direct voltage source, comprising a plurality of threshold devices which each supply an output signal of a first kind if the received direct current is lower than a threshold level associated with the threshold device and which supply an output signal of the second kind if the received direct current is higher than the threshold level, characterized in that means are provided for operating the line at a current which is greater than a given value and which is determined by the length of the line and for automatically adjusting the threshold levels of the threshold devices in dependence upon the intensity of the said current so that independently of the length of the transmission line the threshold levels constantly lie between the various possible levels of the received direct current.

2. In a signalling system of the type comprising a code transmitter for selectively connecting resistors of predetermined values between a pair of lines having a resistance as determined by the length of said lines, receiver means connected to said lines for determining the value of the resistors connected between said lines, said receiver means comprising a plurality of threshold devices having different threshold levels connected to said lines, means for producing a control signal as determined by the resistance of said lines, and means for applying said control signal to said threshold devices for varying their respective theshold levels, whereby operation of said threshold devices is substantially independent of the resistance of said lines.

3. In a signalling system of the type comprising a code transmitter for selectively connecting resistors of predetermined values between a pair of lines, reeciver means connected to said lines for determining the resistance between said lines, said receiver means comprising a source of current connected to said lines, a plurality of threshold devices connected to said lines, said threshold devices having different threshold levels, means for isolating said resistors from said lines, means for producing a control signal responsive to the amplitude of current flow in said lines when said resistors are isolated from said lines, and means for applying said control signal to said threshold devices for varying the threshold levels of said devices, whereby operation of said threshold devices is substantially independent of resistance of said lines.

4. In a signalling system of the type comprising a code transmitter for selectively connecting resistors of predetermined values between a pair of lines, receiver means connected to said lines for determining the resistance between said lines, said receiver means comprising a source of current connected to said lines, a plurality of threshold devices each comprising a saturable magnetic core having at least a line winding, a read winding, a polarizing winding and an output winding, said threshold devices having different threshold levels, a source of polarizing current connected to said polarizing windings, means connecting said line windings in series with said lines whereby current through said line windings produces the opposite magnetic field in said cores as current through said polarizing windings, a source of read pulses connected to said read windings, at least one of said cores having an expansion winding, means connected to one of said output windings for producing a control current resulting from a change of magnetic state of the respective core in response to a read pulse applied to said core in the presence of current flow through the line winding of said core having a value greater than a given current value, and means for applying said control current to said expansion windings whereby operation of said threshold devices is substantially independent of resistance of said lines.

5. The signalling system of claim 4, wherein said code transmitter comprises diode means connected in series with said resistors, and said receiver means comprises means for selectively reversing the flow of current through said line windings.

6. The signalling system of claim 4, wherein said means for producing a control current comprises a capacitor, means for charging said capacitor for a predetermined time in response to an output pulse from said one output winding, a transistor, means for connecting said capacitor between the base and emitter of said transistor, and means for connecting said expansion windings in series with the collector current path of said transistor.

References Cited

UNITED STATES PATENTS

| | | | |
|---|---|---|---|
| 2,038,303 | 4/1936 | Matthies. | |
| 1,761,115 | 6/1930 | Gardner | 179—16 |
| 2,410,866 | 11/1946 | Burgener | 179—84 |
| 2,681,386 | 6/1954 | Davison et al. | 179—84 |
| 2,954,550 | 9/1960 | Starr et al. | 307—88 XR |

KATHLEEN H. CLAFFY, Primary Examiner

W. A. HELVESTINE, Assistant Examiner

U.S. Cl. X.R.

179—84; 307—88